United States Patent [19]

Hutcheson et al.

[11] Patent Number: 4,468,084
[45] Date of Patent: Aug. 28, 1984

[54] INTEGRATED OPTICAL TIME INTEGRATING CORRELATOR

[75] Inventors: Lynn D. Hutcheson, Hopkins; Poohsan N. Tamura, Bloomington, both of Minn.

[73] Assignee: Honeywell Inc., Minneapolis, Minn.

[21] Appl. No.: 443,265

[22] Filed: Nov. 22, 1982

[51] Int. Cl.³ .............................................. G02B 5/174
[52] U.S. Cl. ............................. 350/96.11; 350/96.14; 350/162.13; 350/356; 364/822
[58] Field of Search ............... 350/96.11, 96.12, 96.13, 350/96.14, 162.12, 162.13, 353, 355, 356; 364/822, 827; 372/12, 13

[56] References Cited

U.S. PATENT DOCUMENTS

| | | | |
|---|---|---|---|
| 3,917,384 | 11/1975 | Harper et al. | 350/96.12 X |
| 4,110,016 | 8/1978 | Berg et al. | 350/358 |
| 4,297,704 | 10/1981 | Marom et al. | 364/822 X |
| 4,308,506 | 12/1981 | Ellis | 372/13 X |
| 4,326,778 | 4/1982 | Berg et al. | 350/358 |
| 4,394,060 | 7/1983 | Verber et al. | 350/96.13 |
| 4,403,825 | 9/1983 | Tangonan et al. | 350/96.11 |
| 4,403,833 | 9/1983 | Kenan et al. | 350/356 |
| 4,415,226 | 11/1983 | Verber et al. | 350/96.14 |
| 4,441,186 | 4/1984 | Erickson | 372/19 |

OTHER PUBLICATIONS

Tsai et al., *Applied Physics Letters*, vol. 26, No. 4, Feb. 15, 1975, "High-Performance Acousto-Optic Guided . . .", pp. 140–142.

Schmidt et al., *Applied Physics Letters*, vol. 23, No. 8, Oct. 15, 1973, "Acousto-Optic Diffraction of Guided . . .", pp. 417–419.

Verber, *Laser Focus*, Dec. 1979, "Integrated-Optical Data Processor" pp. 68–70.

*Primary Examiner*—John D. Lee
*Assistant Examiner*—Frank González
*Attorney, Agent, or Firm*—Omund R. Dahle

[57] ABSTRACT

An optical time integrating correlator is fabricated in integrated optical form. This integrated optical implementation comprises a number of integrated components including an optical waveguide on a substrate, a diode laser, a guided wave lens, an electro-optic beamsplitter, a pair of surface acoustic wave transducer for generating first and second counterpropagating surface acoustic waves, a spatial filter and a detector array.

11 Claims, 4 Drawing Figures

INTEGRATED OPTICAL TIME INTEGRATING CORRELATOR

BACKGROUND AND SUMMARY OF THE INVENTION

The present invention is directed to an optical time integrating correlator which is fabricated in integrated optical form. Integrated optics is rapidly increasing in importance for large bandwidth optical signal processing applications. Some of the advantages of using integrated optical techniques over bulk optical techniques include ease of alignment, ruggedness, freedom from vibration effects, tolerant to temperature changes, small size and low fabrication costs.

In the prior art certain optical processing systems have been constructed using bulk (i.e. discrete) optical components including a time integrating correlator. Such an apparatus is described in an article entitled, "A New Surface-Wave Acoustooptic Time Integrating Correlator", by N. G. Berg et al, App.Physics Lett., 36(4), Feb. 15, 1980, P256–258. It is also described in U.S. Pat. No. 4,326,778. FIG. 1 is an example of such prior art as shown in the cited article in which a laser beam 10 is split into two components via a beamsplitter, a transmitted component 11 and a reflected component 12. These two beams enter a SAW (surface acoustic wave) delay line with a prescribed angle $4\theta_B$ between them, in which $\theta_B$ denotes the Bragg angle, $\theta_B = \sin^{-1}[\lambda_1/(2\lambda_a)]$, where $\lambda_1$ is the light wavelength and $\lambda_a$ is acoustic wavelength at the design center frequency, so that one beam interacts primarily with $SAW_1$ while the other beam interacts primarily with the other counterpropagating $SAW_2$. The resulting diffracted beams 13 and 14 are parallel and overlap. They are imaged onto an integrating detector array for some period of time; the final array output contains the cross correlation of the signals used to generate the two SAWs.

Our present disclosure describes an integrated optical implementation of the time integrating correlator. The integrated device comprises several components including a diode laser, an optical waveguide substrate, a guided-wave lens, an electro-optic beamsplitter, a pair of surface acoustic wave transducers for generating first and second counterpropagating surface acoustic waves, a spatial filter and a detector array.

DESCRIPTION

Figure 1:
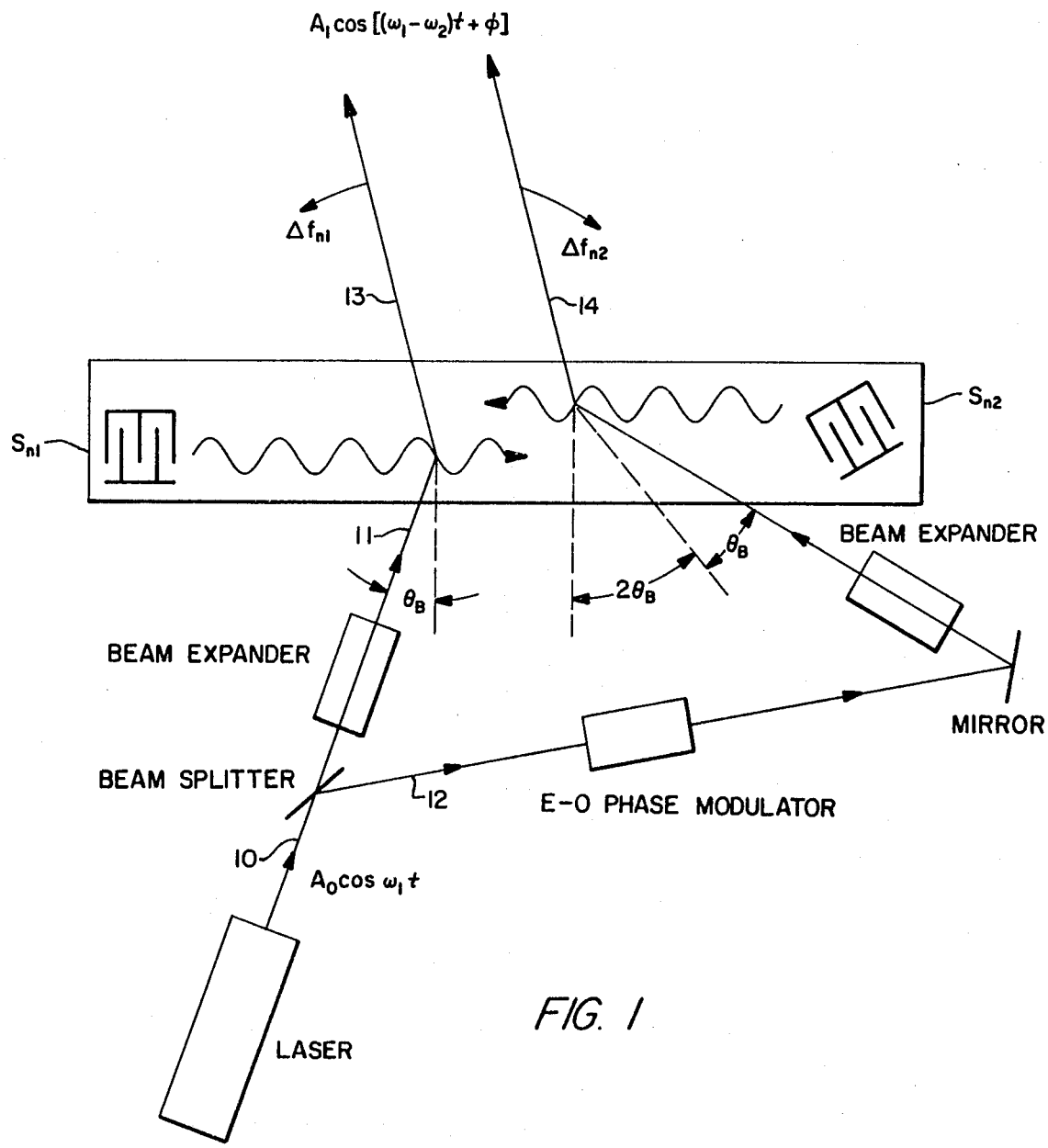
FIG. 1 is a diagrammatic view of prior art.
Figure 2:
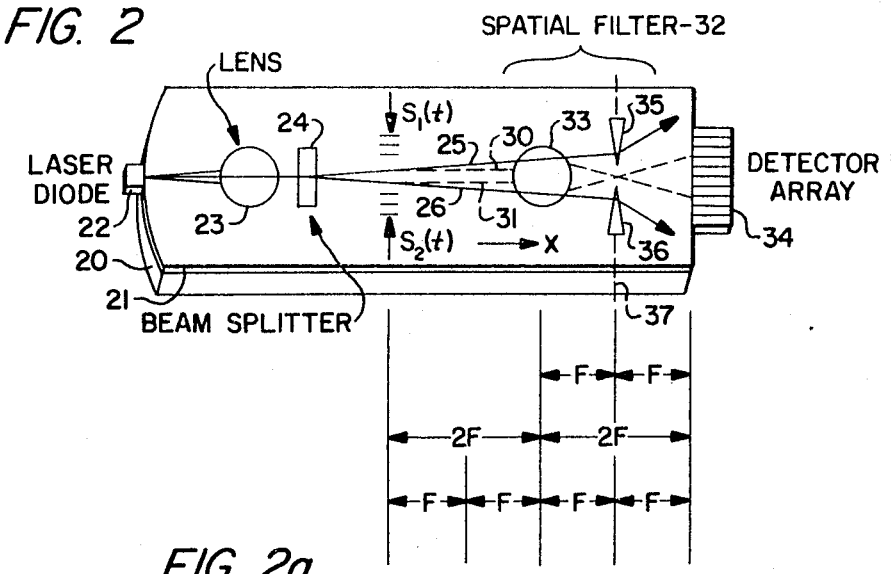
FIG. 2 is a diagrammatic view of the top surface of the integrated optical time integrating correlator device according to the invention.
Figure 3:
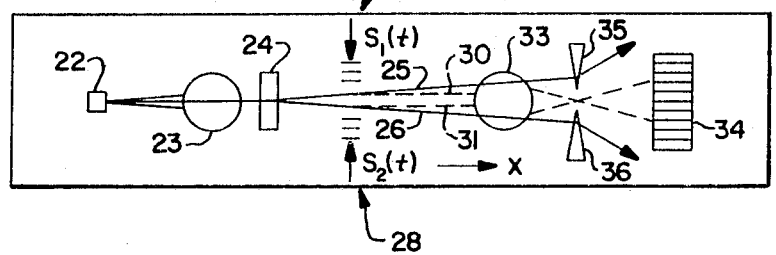
FIG. 3 is a modification of FIG. 2.

As has been described above, our invention describes the fabrication in integrated form of an optical time integrating correlator. Referring to the preferred embodiments of FIGS. 2 and 3 there is shown a single crystal lithium niobate substrate 20 having diffused into the surface thereof a thin layer of titanium to form an optically transmissive surface waveguide 21. The lithium niobate crystal has piezoelectric, electro-optic and waveguiding properties. A light source preferably in the form of a laser diode 22 is either integrated into the crystal, FIG. 3, or butt-coupled or otherwise mounted to the Ti diffused LiNbO₃ optical waveguide which is on the order of one micron thick (FIG. 2). A guided wave lens 23 is fabricated by either cutting an aspheric (i.e. curvilinear) depression in the surface of the substrate (i.e. a geodesic lens) or depositing a thin overlay Luneburg lens on the surface of the waveguide. The lens 23 is effective to collimate the light beam from the diode laser. An electro-optic (EO) beamsplitter 24 splits the collimated optical beam into two components including an undiffracted beam 25 and a diffracted beam 26. The EO beamsplitter is fabricated by photolithographically depositing an interdigitated electrode pattern on the surface of the waveguide. By applying a voltage to the electrode pattern a phase diffraction grating is established in the waveguide. Exiting from the EO beamsplitter are two beams, the undiffracted beam and the diffracted beam. The amount of diffraction is controlled by the strength of the phase grating which is proportional to the applied voltage. Anywhere from 0–100% of the energy can be diffracted by changing the voltage. The voltage is adjusted for 50% efficiency so that the two beams have equal energy. The diffraction angle is determined by the electrode spacing.

The two beams emerging from the EO beamsplitter are identical in both phase and power. It is, therefore, unnecessary to include a phase compensation element which is required in the bulk device. These two beams are then subjected to an acousto-optic interaction with two counterpropagating surface acoustic waves produced by two integrated SAW transducers 27 and 28 placed at their appropriate Bragg diffraction angles. These transducers are identical except for their angular positioning. The transducers 27 and 28 are energized, respectively, by two signals $S_1(t)$ and $S_2(t)$ which are to be correlated. The two counterpropagating surface acoustic waves deflect portions of each of the two optical beams 25 and 26 from the EO beamsplitter such that these two deflected beams 30 and 31 overlap each other and are propagating parallel to the crystal axis (x axis in the figure). These two deflected beams now contain the two signals which are to be correlated (i.e. they are coded).

Figure 2A:
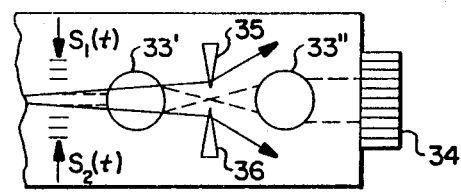
FIG. 2a shows another embodiment of the spatial filter of FIG. 2.

At this point the undeflected beams 25 and 26 and deflected beams 30 and 31 are not separated due to the small deflection angles (less than 1°). If the waveguide was sufficiently long along the x-direction it would be possible to separate these beams since they are traveling at an angle with respect to each other. Unfortunately this is not a satisfactory solution because very long substrates would be required. Therefore, a spatial filter 32 as shown in the figures is fabricated preferably with high index overlay optics. The spatial filter is fabricated with a single lens 33 which images the acoustic pattern onto the the detector array 34 where the lens is 2f (f=focal length of the lens) from the acoustic field and 2f from the detector array. Or one can construct the spatial filter with two lenses 33′ and 33″ such that the lenses are separated by 2f and one of the lenses 33′ is a distance f from the acoustic field and the other lens 33″ is f from the detector array, FIG. 2a. In both cases the distance required is 4 times the focal length of the lens. Better imaging quality is usually accomplished using the latter approach with two lenses. The spatial filtering is accomplished by forming high refractive index optics 35 and 36 at the spatial frequency plane 37 of the lens 33. These high refractive index optics are preferably high refractive index prisms but may be a metallization on the surface which is effective to absorb the non-coded optical beams. The optics may be deposited overlay optics or may be milled or etched. The index of the prisms must be larger than the waveguide index and this causes the undeflected non-coded optical beams from the acoustic field to be further deflected from the detector array. The two optical beams which contain $S_1(t)$ and $S_2(t)$ strike the detector array 34 and the output is I(t) where $$I(t) = |S_1(t) + S_2(t)|^2$$

and the cross term is the term of interest for the correlation of $S_1(t)*S_2(t)$.

In operation the apparatus is used to determine whether and to what extent two signals are correlated. The invention may be used at a receiving station where a "known" signal is compared to an "unknown" signal comprised perhaps of many different signals and noise. If the compared signals show significant correlation it can be concluded that the unknown signal includes the known signal. The unknown signal $S_1(t)$ is used to drive one SAW transducer while the known signal $S_2(t)$ is used to drive the other SAW transducer.

In operation the light beam issues from the laser diode and is collimated by the first lens 23. The collimated beam is then split into two parts, a diffracted beam and an undiffracted beam. The beams are in phase and have equal power (due to proper adjustment of the voltage across the electro-optic phase grating 24). Each beam is then impinged upon by a traveling surface acoustic wave generated by SAW transducers 27 and 28. The interaction between light and elastic waves causes a portion of the light to diffract (deflect) from each of the split beams. The SAW diffracted beams 30 and 31 overlap and propagate colinear with each other and with the x axis of the lithium niobate crystal. The spatial filter 32 is an important element in the operation of the system and the spatial filter is used to reject or steer aside portions of the two beams 25 and 26 that are not diffracted by the SAW transducers 27 and 28. It thus provides means to cause the encoded portions of the beams to fall on the detector and to effectively eliminate the non-coded portions. The prisms 35 and 36 are located at or near the spatial frequency plane 37 so that they may refract beams 25 and 26 from striking the array and saturating it, for only a portion of each beam is diffracted by its corresponding SAW. When the SAW-diffracted beams contain or are modulated by signals that are somewhat correlated, a peak will appear on one or more of the pixels of the detector 34 after a sufficient integration period.

The embodiments of the invention in which an exclusive property or right is claimed are defined as follows:

1. An integrated optical time integrating correlator comprising:
   an optical waveguide comprising a thin layer of titanium diffused into the surface of a LiNbO$_3$ substrate;
   said waveguide being adapted to have a laser beam propagated therethrough;
   first integrated lens means positioned for collimating said laser beam;
   integrated electro-optic beamsplitter means on said waveguide for causing a splitting of said collimated laser beam into two components including an undiffracted beam and a diffracted beam;
   first and second integrated SAW (surface acoustic wave) transducers formed on said waveguide surface for producing first and second counter propagating surface acoustic waves;
   said first and second counter propagating surface acoustic waves positioned to interact, respectively, with said undiffracted beam and said diffracted beam to deflect portions of each of the two beams such that the two deflected beams propagate parallel to each other, overlap each other and are coded to carry the acoustic pattern; and,
   integrated spatial filter means for imaging the acoustic pattern onto a detector array, and for eliminating the non-deflected non-coded portions of both of the undiffracted beam and the diffracted beam.

2. The integrated optical time integrating correlator according to claim 1 in which said optical waveguide is on the order of one micron thick.

3. The integrated optical time integrating correlator according to claim 1 in which said first integrated lens is fabricated by cutting an aspheric depression in the surface of the substrate.

4. The integrated optical time integrating correlator according to claim 1 in which said first integrated lens is of the Luneburg overlay type.

5. The integrated optical time integrating correlator according to claim 1 in which said integrated electro-optic beamsplitter means is fabricated by depositing an interdigitated electrode pattern on the surface of the waveguide, and is controlled by applying a voltage to the electrode pattern so that a phase diffraction grating is established in the waveguide.

6. The integrated optical time integrating correlator according to claim 1 in which said first and second SAW transducers are angularly placed at their respective appropriate Bragg diffraction angles with respect to said undiffracted beam and said diffracted beam.

7. The integrated optical time integrating correlator according to claim 1 in which the integrated spatial filter means includes second integrated lens means for imaging the acoustic pattern onto the detector array.

8. The integrated optical time integrating correlator according to claim 7 in which said second integrated lens means is located at a distance of 2f from the transducers and at a distance 2f from the detector array where f = focal length of the lens.

9. The integrated optical time integrating correlator according to claim 7 in which said second integrated lens means comprises two integrated lens on said waveguide separated by a distance of 2f from one another, wherein the first of the two lens is formed at a distance f from the transducers and wherein the detector array is at a distance f from the second of the two lens where f = focal length of the lens.

10. The integrated optical time integrating correlator according to claim 7 in which said integrated spatial filter means further includes integrated high index optics positioned at the spatial frequency plane of said second lens means for eliminating the non-coded non-deflected portions of both the undiffracted beam and the diffracted beam.

11. The integrated optical time integrating correlator according to claim 10 in which said high index optics comprises integrated high index prisms positioned at the spatial frequency plane of said second lens means.

* * * * *